US009189546B2

(12) United States Patent
Kim et al.

(10) Patent No.: US 9,189,546 B2
(45) Date of Patent: Nov. 17, 2015

(54) SEMANTIC CLIENT, SEMANTIC INFORMATION MANAGEMENT SERVER, METHOD OF GENERATING SEMANTIC INFORMATION, METHOD OF SEARCHING SEMANTIC INFORMATION, AND COMPUTER PROGRAM RECORDING MEDIUM FOR PERFORMING THE METHODS

(75) Inventors: Ki-yong Kim, Seoul (KR); Chang-nam Chu, Yongin-si (KR); Dae-hyun Lee, Seoul (KR); Seung-hyuk Yu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1256 days.

(21) Appl. No.: 12/270,103

(22) Filed: Nov. 13, 2008

(65) Prior Publication Data

US 2009/0198655 A1 Aug. 6, 2009

(30) Foreign Application Priority Data

Feb. 5, 2008 (KR) .................. 10-2008-0011892

(51) Int. Cl.
*G06F 7/00* (2006.01)
*G06F 17/30* (2006.01)
(52) U.S. Cl.
CPC .............................. *G06F 17/30817* (2013.01)
(58) Field of Classification Search
CPC ............... G06F 17/30817; G06F 17/30038; G06F 17/30997
USPC ......... 707/736, 737, 741, 747, 793, 794, 795, 707/796, 790, 705, 914, 915, 916
See application file for complete search history.

(56) References Cited

U.S. PATENT DOCUMENTS 5,692,107 A * 11/1997 Simoudis et al. ............... 706/12
6,801,507 B1 * 10/2004 Humpleman et al. ........ 370/257
(Continued)

FOREIGN PATENT DOCUMENTS

JP 2004-506958 A 3/2004
KR 10-2005-0047323 A 5/2005

OTHER PUBLICATIONS

The Linux Documentation Project, The Unix and Internet Fundamentals HOWTO, "9. How does my computer store things in memory?", https://web.archive.org/web/20070709192559/http://www.tldp.org/HOWTO/Unix-and-Internet-Fundamentals-HOWTO/core-formats.html , Jul. 9, 2007, 3 pp.*

*Primary Examiner* — Marc Somers
(74) *Attorney, Agent, or Firm* — Jefferson IP Law, LLP

(57) ABSTRACT

A semantic client, a semantic information management server, a method of generating semantic information, a method of searching semantic information, and a computer program recording medium for performing the methods, the semantic client including: an identification (ID) generator to generate an ID of a target content; and a descriptor generator to generate a descriptor that defines correlations between the target content and one or more other contents. Furthermore, the semantic information management server includes: a semantic information database (DB) to store a descriptor including information about an ID of contents and correlations among the contents and other contents related to the contents; and an agent to search semantic information of the related contents with reference to the semantic information DB. Therefore, since contents have their own IDs, a user can easily search the contents.

18 Claims, 7 Drawing Sheets

(56) References Cited

U.S. PATENT DOCUMENTS

| | | |
|---|---|---|
| 7,092,969 B2 | 8/2006 | Meek et al. |
| 7,536,713 B1* | 5/2009 | Bartholomew ................... 726/7 |
| 7,657,543 B1* | 2/2010 | Caronni et al. ............... 707/796 |
| 7,792,848 B2* | 9/2010 | Theilmann ................... 707/756 |
| 7,809,728 B2* | 10/2010 | Takahashi et al. ............ 707/741 |
| 7,933,870 B1* | 4/2011 | Webster ........................ 707/638 |
| 2002/0059342 A1* | 5/2002 | Gupta et al. ................... 707/512 |
| 2002/0091848 A1* | 7/2002 | Agresta et al. ................. 709/231 |
| 2003/0229900 A1* | 12/2003 | Reisman ........................... 725/87 |
| 2004/0015479 A1* | 1/2004 | Meek et al. ....................... 707/1 |
| 2004/0073679 A1* | 4/2004 | Martens et al. ............... 709/227 |
| 2004/0186849 A1* | 9/2004 | Enko et al. .................... 707/102 |
| 2005/0273698 A1* | 12/2005 | Smith et al. ................... 715/511 |
| 2006/0167903 A1* | 7/2006 | Smith et al. ................... 707/100 |
| 2009/0043864 A1* | 2/2009 | Shetty ........................... 709/217 |

* cited by examiner

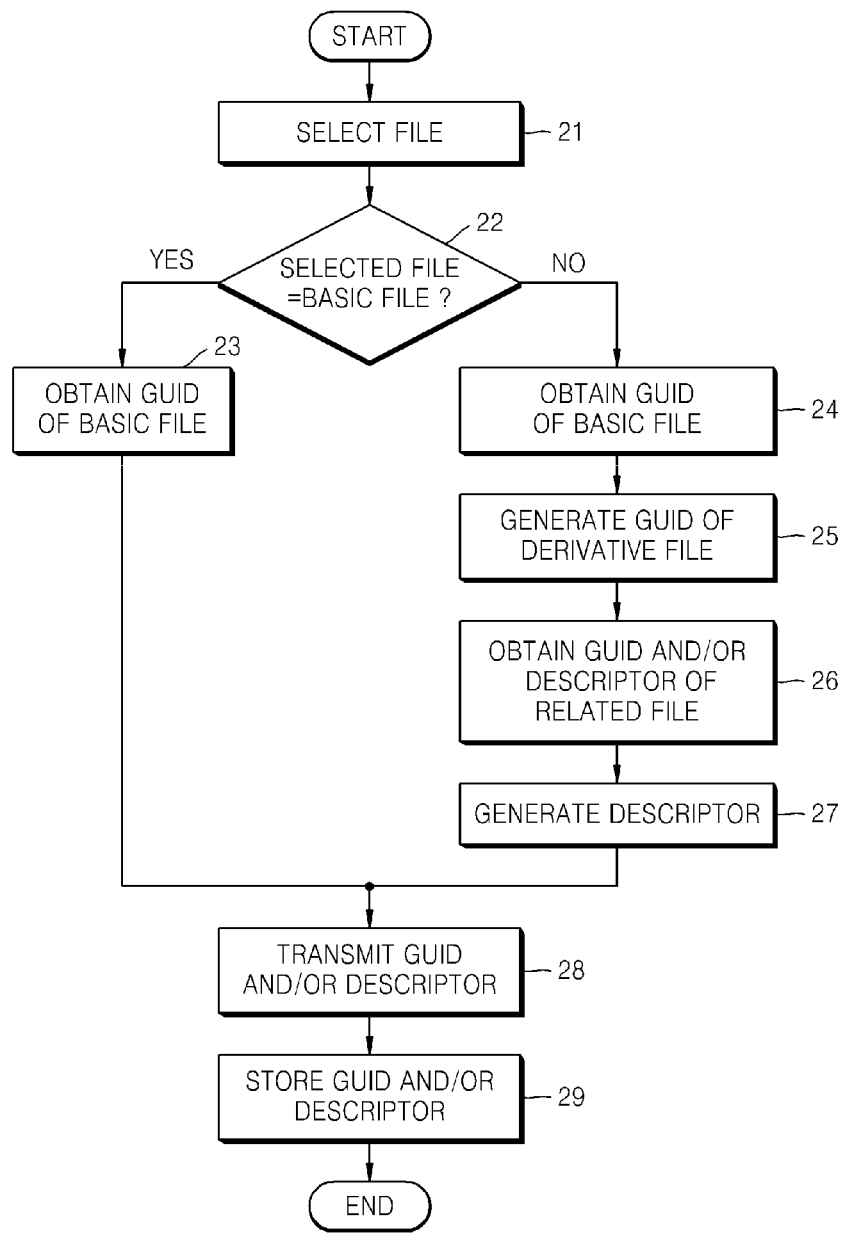

SEMANTIC CLIENT, SEMANTIC INFORMATION MANAGEMENT SERVER, METHOD OF GENERATING SEMANTIC INFORMATION, METHOD OF SEARCHING SEMANTIC INFORMATION, AND COMPUTER PROGRAM RECORDING MEDIUM FOR PERFORMING THE METHODS

CROSS-REFERENCE TO RELATED PATENT APPLICATION

This application claims the benefit of Korean Patent Application No. 2008-11892, filed on Feb. 5, 2008, in the Korean Intellectual Property Office, the disclosure of which is incorporated herein in its entirety by reference.

BACKGROUND OF THE INVENTION

1. Field of the Invention

Aspects of the present invention relate to a search for contents, and more particularly, to a method and an apparatus for generating semantic information for contents to quickly and accurately search contents.

2. Description of the Related Art

Recently, high-speed, high-capacity communication technology has been developed with the development of multimedia related technology. Thus, multimedia contents having a large size are scattered throughout a virtual space based on the Internet. Also, various types of contents are directly or indirectly related to one another. For example, if a moving picture file (e.g., ucc.avi) is produced, a plurality of related files including subtitles (e.g., ucc.smi), descriptions (e.g., ucc-desc.txt), screen shots (e.g., ucc1.jpg, ucc2.jpg), etc. of the moving picture file, are produced.

However, such contents are produced in various independent formats and scattered in several places on a network. Therefore, according to a conventional communication technology, it is impossible to uniformly and efficiently manage and search related contents. If a user desires to obtain a subtitle file (e.g., ucc.smi) to view a moving picture file (e.g., ucc.avi), the user directly drives a search engine, searches a file using a keyword search or a tag search, and selects an appropriate one from numerous searched files. However, the keyword search or the tag search leads to unsatisfied results and/or a large amount of search time.

In addition, there is a need for a new approach for managing contents to support an agent-based web 3.0 service, a semantic web service, and/or and intelligent Internet Protocol (IP) Television (IPTV) technology. In other words, there is required new semantic information that an agent is able to understand.

SUMMARY OF THE INVENTION

Aspects of the present invention provide a semantic client, a semantic information management server, a method of generating semantic information, a method of searching semantic information, and a computer-readable recording medium to perform the methods, in order to accurately and quickly search contents.

According to an aspect of the present invention, there is provided a semantic client to manage a plurality of contents, the semantic client including: an identification (ID) generator to generate an ID of a target content from among the plurality of contents; and a descriptor generator to generate a descriptor that defines correlations between the target content and one or more of the plurality of contents.

According to another aspect of the present invention, there is provided a semantic information management server to manage a plurality of contents, the semantic information management server including: a semantic information database (DB) to store an ID of a target content and a descriptor including information about correlations among the target content and other contents related to the target content, and IDs of the other contents related to the target content; and an agent to search semantic information of the related contents with reference to the semantic information DB.

According to another aspect of the present invention, there is provided a method of generating semantic information, the method including: determining whether a target content is basic content or derivative content; and generating semantic information of the target content according to whether the target content is the basic content or the derivative content.

According to another aspect of the present invention, there is provided a method of searching semantic information, the method including: if a target content is basic content, interpreting an ID of the target content; if the target content is derivative content, interpreting an ID and a descriptor of the target content; and searching semantic information of related contents to the target content with reference to interpretation results of the ID and/or the descriptor.

According to another aspect of the present invention, there is provided a computer-readable recording medium having embodied thereon a computer program for executing the method of generating the semantic information.

According to another aspect of the present invention, there is provided a computer-readable recording medium having embodied thereon a computer program for executing the method of searching the semantic information.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a flowchart of detailed operations of a method of generating semantic information according to an embodiment of the present invention;

DETAILED DESCRIPTION OF THE EMBODIMENT

Figure 1A:
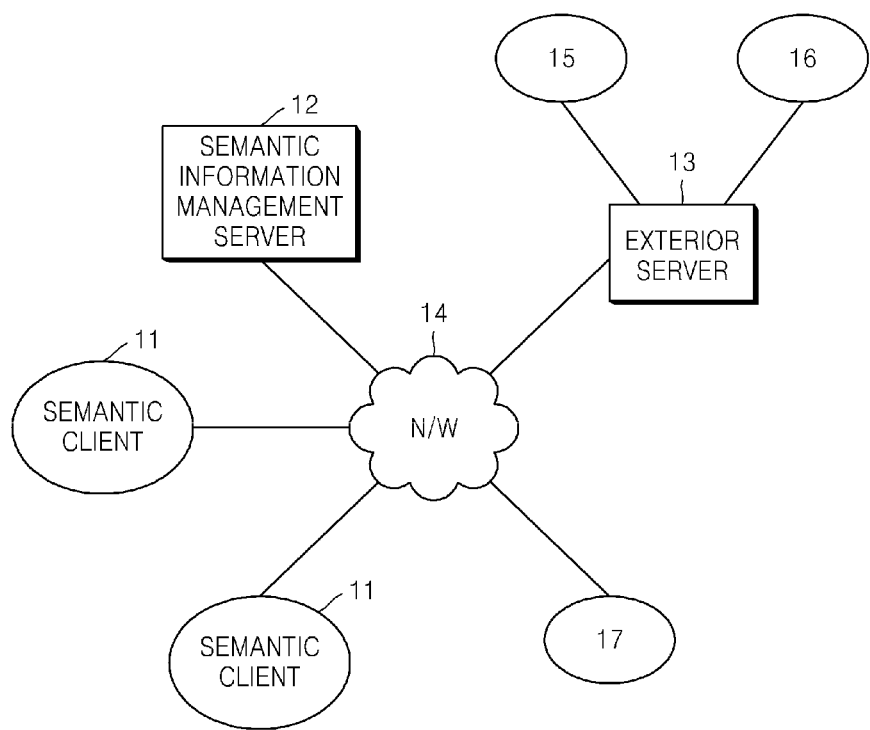
FIG. 1A illustrates a semantic information management system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A method and an apparatus to generate and/or search semantic information according to aspects of the present invention may be applied to various types of contents and information data (e.g., moving picture files, still image files, audio files, text files, multimedia files, frames, objects, uniform resource locators (URLs), Internet Protocol (IP) addresses, phone numbers, etc.). Hereinafter, it will be understood in aspects of the present invention that contents include all types of contents and information data. However, for convenience of description, several types of files (e.g., moving picture files, subtitle files, etc.) will be used as non-limiting examples of contents.

FIG. 1A illustrates a semantic information management system according to an embodiment of the present invention. Referring to FIG. 1A, the semantic information management system includes semantic clients 11, a semantic information management server 12, external devices 13 and 15 through 17, and a network 14 that connects the clients 11, the server 12, and the external devices 13 and 15 through 17.

Figure 1B:
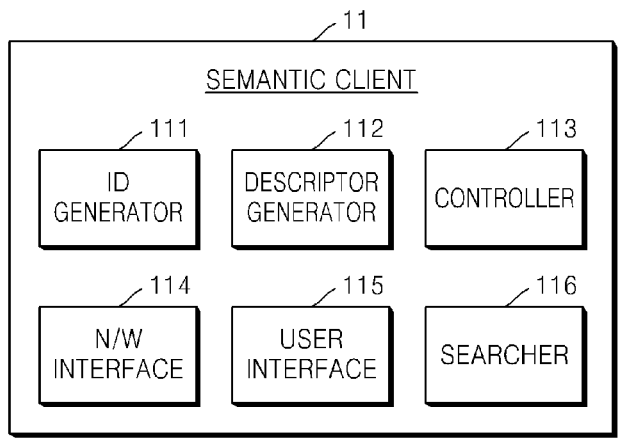
FIG. 1B is a detailed block diagram of a semantic client of FIG. 1A.

FIG. 1B is a detailed block diagram of the semantic client 11 of FIG. 1A. Referring to FIG. 1B, the semantic client 11 includes an identification (ID) generator 111, a descriptor generator 112, a controller 113, a network interface 114, a user interface 115, and a searcher 116. The ID generator 111 generates an ID for each file. An example of the generated ID includes a hash Globally Unique Identifier (GUID). The hash GUID is a proper ID that is obtained by applying a hash function to a binary combination of file data. The descriptor generator 112 generates a descriptor that includes a definition of a relation between a target file and another file. The descriptor also includes a GUID of a related file generated by the ID generator 111.

Figure 1C:
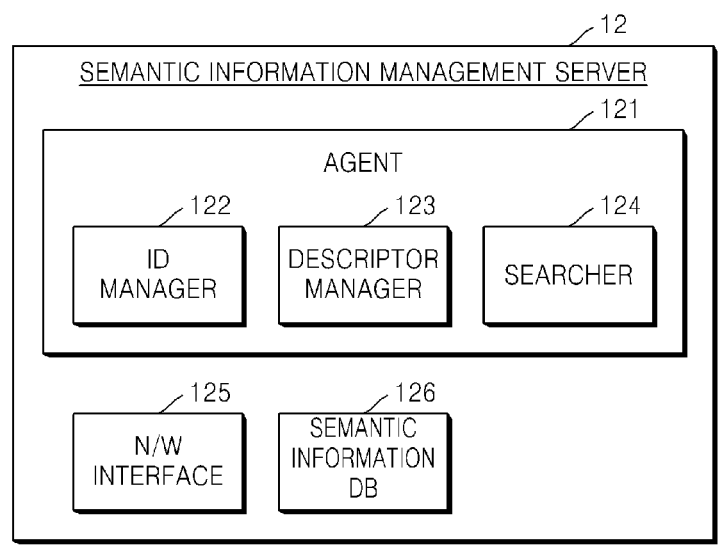
FIG. 1C is a detailed block diagram of a semantic information management server of FIG. 1A.

FIG. 1C is a detailed block diagram of the semantic information management server 12 of FIG. 1A. The semantic information management server 12 generally manages an ID and a descriptor of a file, inquires about and discards an ID, shares an ID with an external server, etc. The semantic information management server 12 includes an agent 121, a semantic information database (DB) 126, and a network interface 125. The agent 121 includes an ID manager 122, a descriptor manager 123, and a searcher 124. The agent 121 provides an interface with the external server 13.

FIG. 2 is a flowchart of detailed operations of a method of generating semantic information according to an embodiment of the present invention. It is understood that the semantic client 11 itself generates a new file or obtains a file from other devices (e.g., the external devices 13 and 15 through 17). Also, the semantic client 11 generates semantic information (e.g., a GUID, a descriptor, etc.) to register the new file in the semantic information management server 12. Therefore, in operation 21, the semantic client 11 selects a file (e.g., avi, jpg, smi, txt) for which semantic information is to be generated.

In operation 22, a controller 113 determines whether the selected file is a basic file or a file deriving from the basic file. If the selected file is the basic file (e.g., avi) (operation 22), the ID generator 111 generates a GUID (for example, a hash GUID) of the basic file in operation 23. The hash GUID is based on a hash function and uses a binary combination of the file data. Thus, although a name, a source, etc., of a file are changed, the same ID is generated for the same file. It is understood that aspects of the present invention are not limited to a hash GUID as the ID generated by the ID generator 111. That is, a proper ID of each file may be generated using other methods.

If the selected file is the derivative file (e.g., jpg) (operation 22), the semantic client 11 obtains an ID of the basic file. Next, in operation 24, the controller 113 obtains a GUID of the basic file related to the derivative file from the semantic information management server 12 through the network interface 114.

In operation 25, the ID generator 111 generates a GUID (such as a hash GUID) of the derivative file using a binary combination of the derivative file data. Here, the ID generator 111 generates the hash GUID of the derivative file with reference to the GUID of the basic file. Since the GUID of the derivative file is generated with reference to the GUID of the basic file, the GUID of the basic file (or the GUID of the derivative file) may be easily searched using the GUID of the derivative file (or the GUID of the basic file).

The controller 113 first obtains information to generate a descriptor of the derivative file. In other words, in operation 26, the controller 113 obtains GUIDs and descriptors of files (e.g., avi, txt) related to the derivative file (e.g., jpg) from the semantic information management server 12.

In operation 27, the descriptor generator 112 of the semantic client 11 generates a descriptor of the derivative file. The descriptor generator 112 defines attributes of files and relations between a file and other files with reference to the GUIDs and the descriptors of the files related to the derivative file. The generated descriptor may be an Extensible Markup Language (XML) document that includes attributes of files, correlations among the files, GUIDs of the files, etc. An example of the descriptor is as follows:

```
(1)   <semantic>
(2)     <class-def>
(3)       <class name="Image2.jpg">
(4)         <superclass-of>
(5)           <class name="Movie.avi" GUID="024DEE41-33E7-11D3-9D69-0008C7 81F39F"/>
(6)             <relation>
(7)               video
(8)             </relation>
(9)         </superclass-of>
(10)          <subclass-of>
(11)            <class name="Movie_Description.Txt" GUID="C12A7328-F81F-11D2-BA4B-00A0C93EC93B"/>
(12)            <class name="Movie_info.htm" GUID="EBD0A0A2-B9E5-4433-87C0-68 B6B72699C7"/>
(13)            <class name="HyperLink" GUID="75894C1E-3AEB-11D3-B7C1-7B03A0000000">
(14)              <url value="http://movie.com"/>
(15)            </class>
(16)          </subclass-of>
(17)       <class>
(18)     <class-def>
(19)   <semantic>
```

A file name "image2.jpg" of an image file that is a derivative file is described on the third line of the descriptor. Therefore, the descriptor relates to the image file "image2.jpg." A GUID of a basic file "movie.avi" of the image file "image2.jpg" and a relation, "movie," between the image file "image2.jpg" and the basic file "movie.avi" are defined on a tag "superclass." A tag "subclass" includes GUIDs of files "movie_description.txt" and "movie_infor.htm" that are related to the image file "image2.jpg" and derive from the basic file "movie.avi." The tag "subclass" also includes a website address "http://movie.com" that is hyperlinked to the image file "image2.jpg."

The GUID of the basic file generated in operation 23 is transmitted to the semantic information management server 12 through the network interface 114. In operation 28, the GUID of the generated derivative file (operation 25) and/or the generated descriptor of the derivative file (operation 27) are also transmitted to the semantic information management server 12 through the network interface 114. In operation 29, the semantic information management server 12 receives the GUID and/or descriptor of the derivative file from the semantic client 11 and stores the GUID and/or descriptor in the semantic information DB 126.

Figure 3:
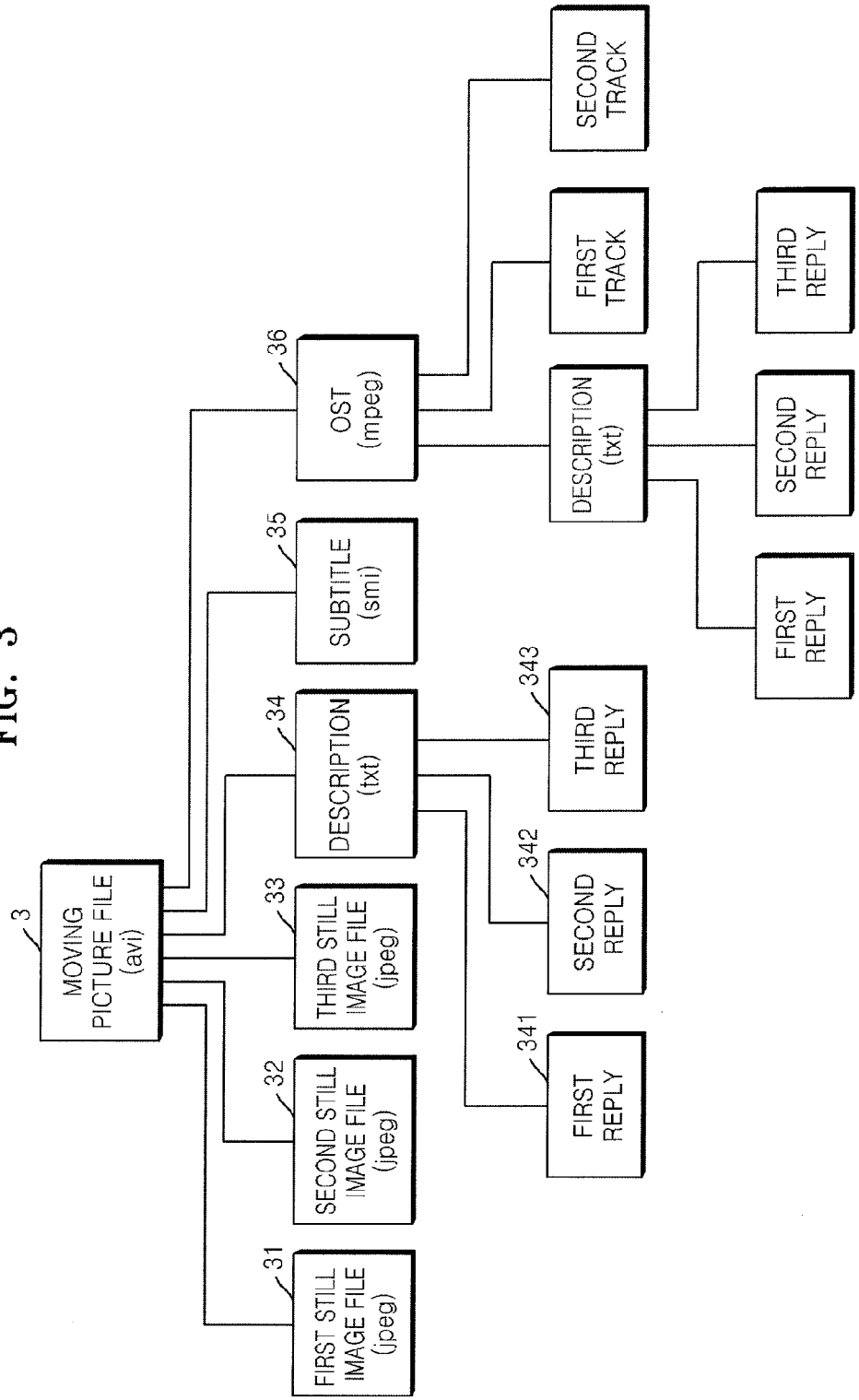
FIG. 3 illustrates a semantic structure of a group of files generated and stored using a method of generating semantic information according to an embodiment of the present invention.

FIG. 3 illustrates a semantic structure of a group of files generated and stored using a method of generating the semantic information according to an embodiment of the present invention. Nodes of the semantic structure respectively symbolize a file, a website address, a phone number, etc. The nodes form a hierarchical structure including a parent node, child nodes, grandchild nodes, etc. Relations among the nodes are expressed with solid lines.

Referring to FIG. 3, a moving picture file 3 is in a position of a parent node in the semantic structure. Derivative files 31 through 36 of the moving picture file 3 are positioned in child nodes. Files in the child nodes may also have child nodes (i.e., there may be parent nodes having child nodes and grandchild nodes). For example, a description file 34 has first through third replies 341 through 343 as their child nodes.

Figure 4:
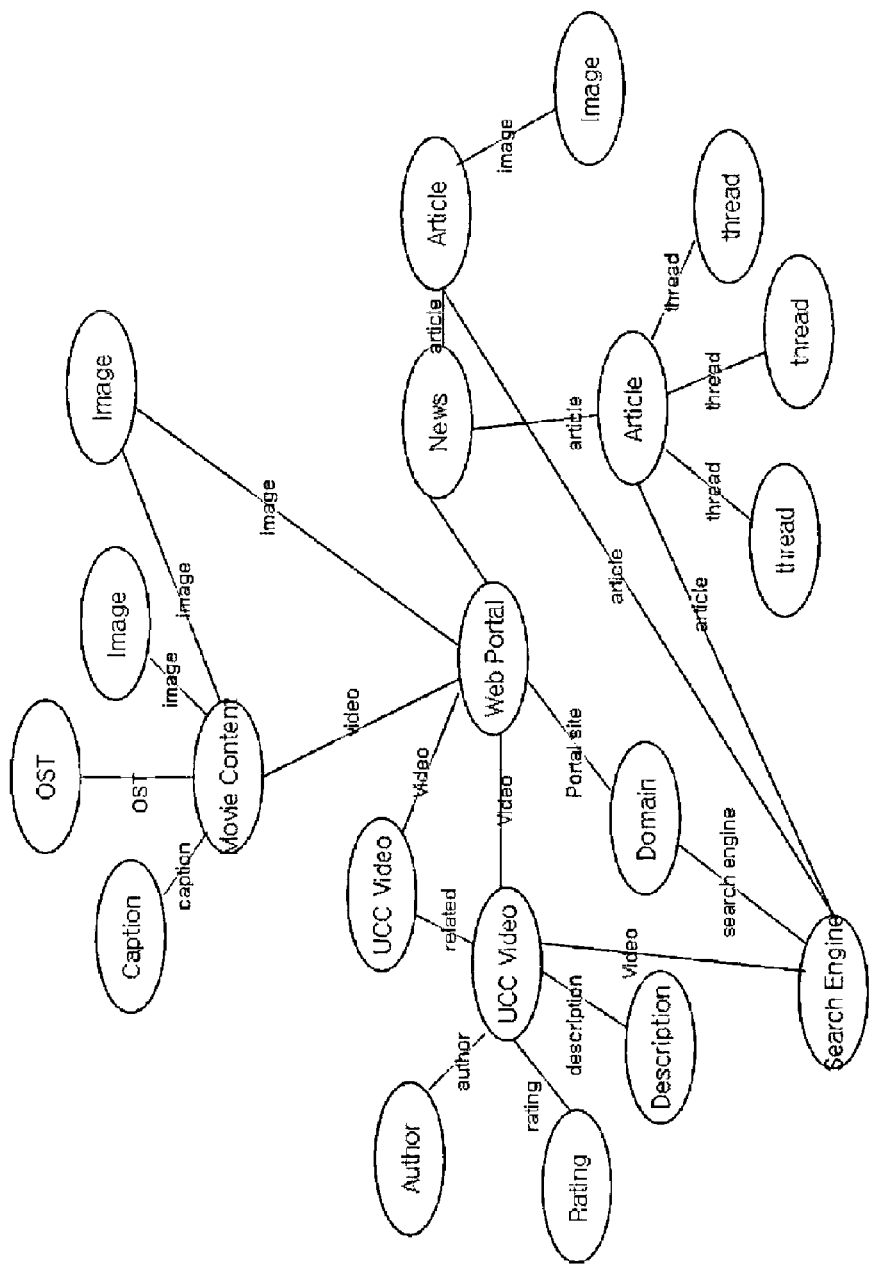
FIG. 4 illustrates a semantic structure of semantic information generated and stored using a method of generating semantic information according to another embodiment of the present invention.

FIG. 4 illustrates a semantic structure of semantic information generated and stored using a method of generating the semantic information according to another embodiment of the present invention. Referring to FIG. 4, the semantic structure is a multi-dimensional structure. In other words, semantic structures having 1-dimensional structures (such as shown in FIG. 3) are combined with one another to have organic relations with one another.

Figure 5:
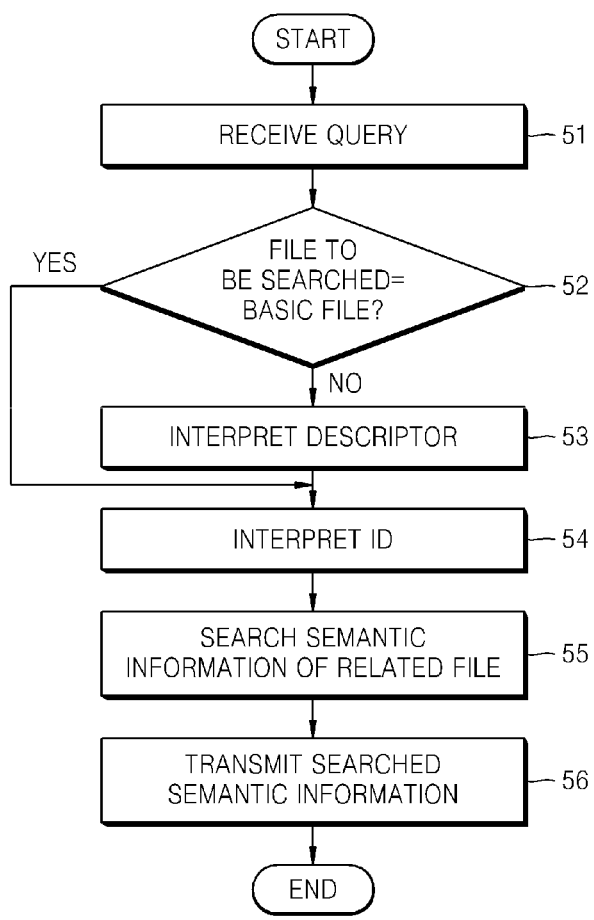
FIG. 5 is a flowchart of detailed operations of a method of searching semantic information and a file using the semantic information according to an embodiment of the present invention.

FIG. 5 is a flowchart of detailed operations of a method of searching semantic information and a file using the semantic information according to an embodiment of the present invention. Referring to FIG. 5, a user inputs a query to the semantic client 11 to search files related to a file, and the semantic client 11 transmits the query together with a GUID and a descriptor of the file to the semantic information management server 12 in operation 51.

In operation 52, the agent 121 of the semantic information management server 12 receives the query and determines what type of file the file is. If it is determined that the file is a basic file (operation 52), the ID manager 122 interprets the GUID with reference to the query in operation 54. If it is determined that the file is a derivative file (operation 52), the descriptor manager 123 interprets the descriptor of the derivative file in operation 53 and the GUID of the derivative file in operation 54.

In operation 55, the searcher 124 searches the semantic information DB 126 for semantic information of a related file with reference to the interpretation results of the GUID and the descriptor. In operation 56, the semantic information management server 12 transmits the searched semantic information to the semantic client 11 through the network interface 125. Accordingly, the searcher 116 of the semantic client 11 can search the external server 13, etc., for the related file using the semantic information of the related file received from the semantic information management server 12 and then receives the related file from the external server 13, etc.

A user may search related files with little effort using a method of searching a file using semantic information according to aspects of the present invention. For example, if the user has already obtained a second still image file 32 shown in FIG. 3 and desires to search files related to the second still image file 32, the user may easily search the basic file (i.e., the moving picture file 3) and first and second still image files 31 and 32, a description file 34, a first reply 341, etc., that are other derivative files, using the agent 121 of the semantic information management server 12.

Figure 6A:
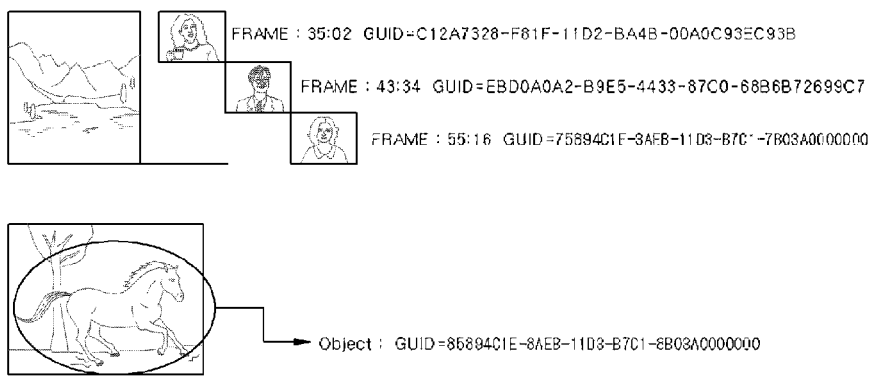
FIGS. 6A and 6B illustrate elements of a file that adopt the method of generating semantic information according to an embodiment of the present invention.
Figure 6B:
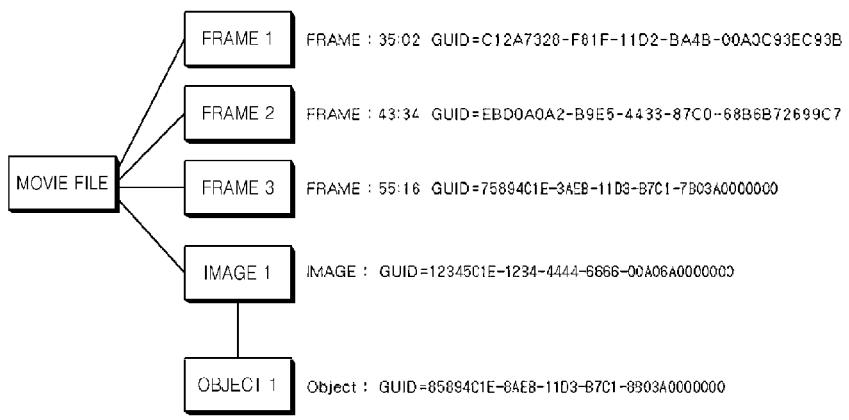

FIGS. 6A and 6B illustrate elements of a file that adopt a method of generating the semantic information according to an embodiment of the present invention. As shown in FIG. 6A, a movie file is divided into a plurality of frames (i.e., first through third frames 1 through 3) and an image. Next, each of the frames or the image (e.g., a horse) is divided into objects.

As shown in FIG. 6B, GUIDs of the movie file, the frames, the image, and the objects are generated to be allocated to the movie file, the frames, the image, and the objects, respectively. A descriptor (or a semantic structure) is generated based on relations among the movie file, the frames, the image, and the objects.

As described above, according to aspects of the present invention, contents have their own IDs such that a user can easily search the contents. Also, the user can quickly and accurately search one type of content and other types of contents related to the one type of content using IDs and descriptors of the content. In addition, IDs of the contents can be transmitted without the actual contents to transmit information between devices so as to improve transmission efficiency. Moreover, IDs can be allocated to frames or objects in an image of a movie or a moving picture so as to allow the frames or the objects in the image to be selected as a target to be searched. Furthermore, aspects of the present invention can be applied to web 3 services, semantic web services, intelligent IPTV services, media portal services, etc., to support contents-related automation and personalization services.

Aspects of the present invention can also be embodied as computer-readable codes on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A semantic client to manage a plurality of content, the semantic client comprising:
    a processor configured to determine whether a type of a target content is a basic content or a derivative content, the derivative content being related to but different from a corresponding basic content, generate an identification (ID) of the target content according to the determined type of the target content, selectively generate a descriptor that defines correlations between the plurality of content according to the determined type of the target content; and a storage unit configured to store at least one of the basic content, the derivative content, the ID of the target content, and the descriptor, wherein, when the determined type of the target content is the basic content, the processor generates an ID of the target content based on a binary combination of data of the target content, wherein, when the determined type of the target content is the derivative content, the processor generates an ID of the target content based on a binary combination of an ID of the corresponding basic content related to the target content and a binary combination of the data of the target content, and generates the descriptor based on IDs of content related to the target content and descriptors of the content related to the target content, wherein the descriptor includes attributes of basic content relating to the derivative content, an ID of the basic content relating to the derivative content, attributes of related derivative content, and IDs of the related derivative content, wherein the ID of the target content generated based on the ID of the corresponding basic content and the ID of the corresponding basic content are different from each other, and wherein the basic content and the derivative content form a hierarchical structure.

2. The semantic client as claimed in claim 1, wherein the processor does not generate the descriptor if the determined type of the target content is basic content.

3. The semantic client as claimed in claim 1, wherein the processor generates the ID of the target content as a hash Globally Unique Identifier.

4. The semantic client as claimed in claim 1, further comprising a network interface to transmit the ID and/or the descriptor to a semantic information management server connected to the semantic client through a network.

5. The semantic client as claimed in claim 4, further comprising:

a user interface to receive a query to search content related to the target content, wherein the network interface transmits the query to the semantic information management server, and the network interface receives semantic information of the related content from the semantic information management server.

6. The semantic client as claimed in claim 5, further comprising:

a searcher to search one or more external devices connected to the semantic client through the network for the related content according to the received semantic information of the related content.

7. A method of generating semantic information of a target content, the method comprising:

determining whether a type of the target content is a basic content or a derivative content;

generating semantic information of the target content according to the determined type of the target content;

when the determined type of the target content is the basic content, generating identification (ID) of the target content based on a binary combination of data of the target content; and when the determined type of the target content is the derivative content:

generating ID of the target content based on a binary combination of an ID of the basic content corresponding to the derivative content and a binary combination of data of the target content, and generating the descriptor based on IDs of content related to the target content and descriptors of the content related to the target content, wherein the descriptor includes attributes of basic content relating to the derivative content, an ID of the basic content relating to the derivative content, attributes of related derivative content, and IDs of the related derivative content, wherein the basic content and the derivative content form a hierarchical structure.

8. The method as claimed in claim 7, wherein the generating of the semantic information of the target content further comprises obtaining an identification (ID) and a descriptor of the one or more related contents.

9. The method as claimed in claim 7, further comprising transmitting the generated semantic information to a semantic information management server.

10. The method as claimed in claim 7, wherein the target content is a moving picture file, a still image file, an audio file, a text file, a multimedia file, a frame, an object, a uniform resource locator (URL), an Internet Protocol (IP) address, and a phone number.

11. The method as claimed in claim 7, wherein the generating of the ID of the target content comprises generating a hash Globally Unique Identifier (GUID) using a binary combination of data of the target content.

12. A non-transitory computer-readable recording medium having embodied thereon a computer program for executing the method of claim 7.

13. A method of searching semantic information of contents related to a target content, the method comprising:

receiving a query from a semantic client to search for the semantic information of related contents;

determining whether a type of the target content is a basic content or a derivative content;

when the determined type of the target content is the basic content, interpreting an identification (ID) of the target content; and when the determined type of the target content is the derivative content, interpreting the ID of the target content based on an ID of the target content, and interpreting a descriptor of the target content, wherein the descriptor includes attributes of basic content relating to the derivative content, an ID of the basic content relating to the derivative content, attributes of related derivative content, and IDs of the related derivative content, wherein, when the determined type of the target content is the basic content, the ID of the target content is generated based on a binary combination of data of the target content, and wherein, when the determined type of the target content is the derivative content, the ID of the target content is generated based on a binary combination of an ID of the corresponding basic content related to the target content and a binary combination of the data contained of the target content.

14. The method as claimed in claim 13, wherein the semantic information is searched with reference to IDs and/or descriptors of the related contents.

15. The method as claimed in claim 13, further comprising: interpreting the query.

16. The method as claimed in claim 15, further comprising transmitting the semantic information of the searched related contents to the semantic client.

17. The method as claimed in claim 13, further comprising: receiving an ID of the target content from a semantic client.

18. A non-transitory computer-readable recording medium having embodied thereon a computer program for executing the method of claim 13.

* * * * *